United States Patent [19]
Lee

[11] Patent Number: 5,697,526
[45] Date of Patent: Dec. 16, 1997

[54] DISPENSING UNITS FOR LIQUIDS

[76] Inventor: Gary K. Lee, 5827 S. 81st East Place, Tulsa, Okla. 74145

[21] Appl. No.: 393,698

[22] Filed: Feb. 24, 1995

[51] Int. Cl.$^6$ ............................................. G01F 11/02
[52] U.S. Cl. .................... 222/113; 222/132; 222/146.6; 222/181.1; 222/183; 222/207; 222/214
[58] Field of Search .................... 222/113, 129, 222/132, 135, 146.6, 181.1, 181.2, 181.3, 183, 207, 214

[56]  References Cited

U.S. PATENT DOCUMENTS

| | | | |
|---|---|---|---|
| 2,541,352 | 2/1951 | Ginter | 222/113 X |
| 2,746,646 | 5/1956 | Hall | 222/113 |
| 4,256,242 | 3/1981 | Christine | 222/207 |
| 4,288,007 | 9/1981 | Rogers et al. | 222/181.2 X |
| 4,773,569 | 9/1988 | Larsson | 222/207 X |
| 4,804,118 | 2/1989 | Mullen et al. | 222/146.6 X |
| 4,946,075 | 8/1990 | Lundback | 222/207 X |
| 4,961,508 | 10/1990 | Weimer et al. | 222/214 X |
| 5,248,066 | 9/1993 | Olson et al. | 222/214 X |
| 5,333,758 | 8/1994 | Jamison et al. | 222/214 X |
| 5,524,795 | 6/1996 | Lee | 222/207 |

*Primary Examiner*—Kevin P. Shaver
*Attorney, Agent, or Firm*—Scott R. Zingerman; Frank J. Catalano

[57]  ABSTRACT

This includes a condiment, such as mustard, catsup, etc. dispensing unit. The condiment is in a container such as a bottle with a neck portion which is attached to a novel plastic dispenser cap. When the device is hanging upside down, the condiment in the container flows into the dispensing tip which has a valve mechanism such that no fluid flows out the end of the tip until pressure is applied by squeezing the plastic tip. A push rod with two spaced apart arms has a roller at the end of each arm. The rollers are a lesser distance apart than the diameter of the dispensing nipple. When the rod pushes the arm, the rollers roll against the dispensing nipple, squeezing and compressing it, and forcing its condiments out the lower end.

10 Claims, 9 Drawing Sheets

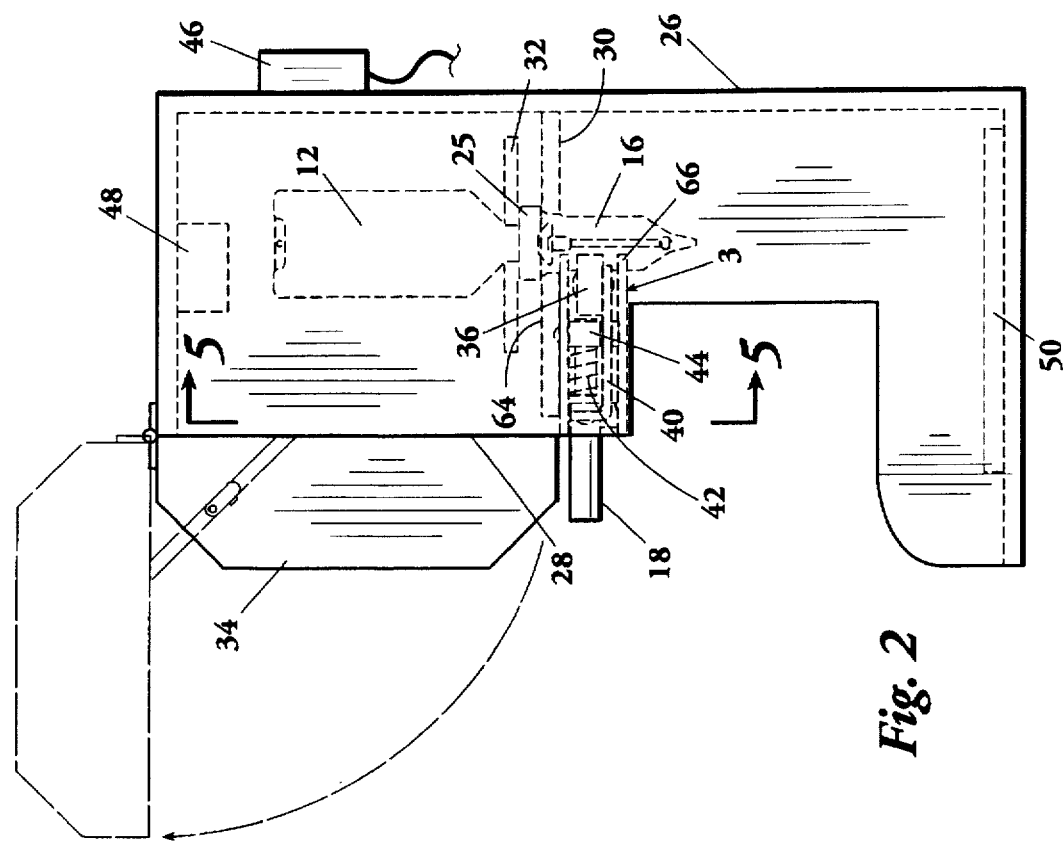

DISPENSING UNITS FOR LIQUIDS

BACKGROUND OF THE INVENTION

1. Field of the Invention

This invention relates to apparatus for dispensing of liquids such as foods, industrial soaps, health and beauty aids, and condiments. It relates especially to a dispensing unit including a housing in which is secured a plurality of different containers of various condiments which can be dispensed through squeezing means for dispensing nipples attached to the container.

2. Background of the Invention

Condiments such as mustard, catsup, mayonnaise, and various other sauces are widely dispensed in restaurants and cafes and especially in the fast food market. Restaurants have various dispensing systems for these condiments, such as catsup bottles or mustard bottles. Some of these bottles are rigid, and others are plastic where they can be squeezed. Many of the fast food restaurants have condiments in small plastic packages. When the customer needs catsup, for example, he tears off a corner of one of the packages and squeezes the product (such as mustard or catsup) onto the sandwich. The use of such packages leaves a lot to be desired. They are very messy, and also they waste a lot of condiment being dispensed.

SUMMARY OF THE INVENTION

This invention includes a hand operated condiment dispensing unit for holding dispensing bottles, each such dispensing bottle having a flexible nipple attached thereto. The housing includes two sides, a back, and a front side having a door. There is a horizontal shelf in the housing with a plurality of passages therethrough to receive each of the dispensing nipples. Means are provided to maintain the bottles in an upright inverted position. Squeezing means are supported within the housing and adjacent the shelf and operable for squeezing each said nipple to cause the selected nipple to dispense the condiment which is in its associated bottle.

In one embodiment, the means for maintaining the condiment bottle in an upright condition includes a fixed tray with holes therethrough to permit the passage of the dispensing nipples of the condiment bottles. Above the fixed tray is a slidable tray which has a plurality of outwardly opening slots. When this removable tray is in its back position, it is against the back of the housing, and its notches do not engage the dispensing nipples. When the bottles are put in, the slidable tray is pulled forward, and the notches engage the neck of the condiment bottle to aid in holding it in a safe upright position. Mechanical squeezing means are provided just below and supported by the fixed tray. The squeezing means include a plurality of units, each unit having a support bracket supported by the fixed plate or tray. The support bracket has a hole therethrough. A push rod extends from outside the housing through the hole in the support bracket. Two spaced apart parallel arms are supported from the push rod. A vertical roller is provided at the end of each of the arms, the distance between the rollers being less than the diameter of the dispensing nipple and spaced such that when the push rod is pushed in, the vertical rollers are operable to squeeze the plastic nipple to dispense the fluid therefrom. Biasing means are provided for pushing the push rod in a direction outwardly from said support bracket when force is relieved by the user.

It is an object of this invention to provide a condiment dispensing unit which can dispense any one of a number of condiments or liquids without prepackaging of individual size packages.

It is another object of this invention to provide mechanical squeezing means for dispensing condiments from squeezable nipple attached to a condiment container.

These and other objects will become more apparent from the following description taken in conjunction with the drawings in which:

BRIEF DESCRIPTION OF THE DRAWINGS

FIG. 1 is a front view of a dispensing unit illustrating the position of condiment storage containers with squeezable nipples and means for disbursing condiments or liquids from the nipple.

FIG. 2 is a side view illustrating the dispensing unit of this invention.

FIGS. 7 and 8 is a side view illustrating the detailed squeezing action, in which FIG. 7 shows the rollers just as they approach the nipple, and FIG. 8 shows the rollers having squeezed the nipple into the dispensing state.

DETAILED DESCRIPTION OF THE PREFERRED EMBODIMENT

Figure 3:
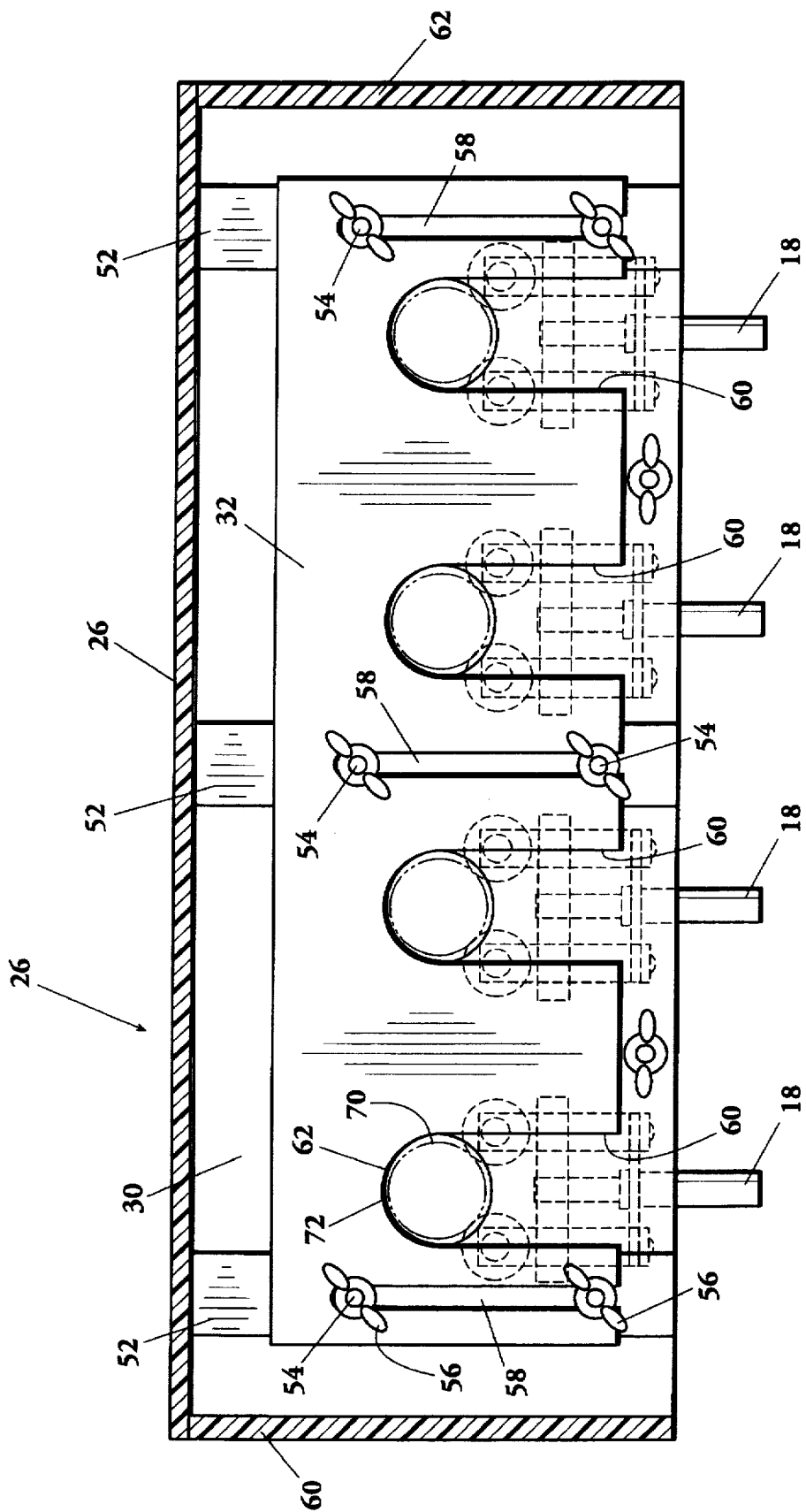
FIG. 3 is a view taken along the line 3—3 of FIG. 1.
Figure 4:
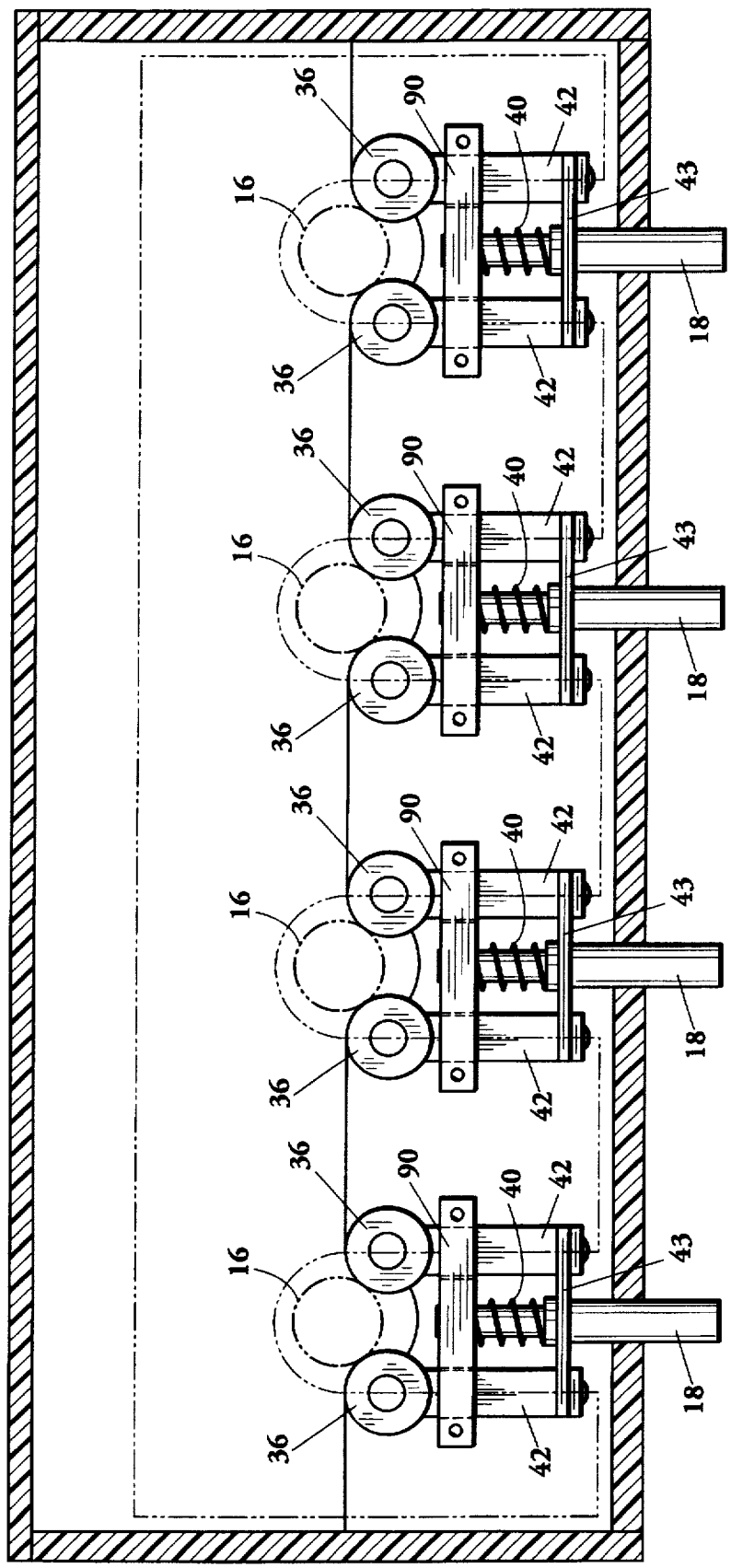
FIG. 4 is a view taken along the line 4—4 of FIG. 1.

Attention is first directed to FIGS. 1 and 2 for an overview of the invention. FIG. 1 is a front elevation view, and FIG. 2 is a side elevation view of the condiment dispensing unit of this embodiment. Part of the elements are shown in dashed lines. Shown in FIG. 1 are four condiment containers 12 which contain whatever condiments might be desired to be dispensed, such as mustard, catsup, sauce, and so forth. The dispensing mechanism could be used on only one container or bottle, but most food dispensers would probably want at least three of four. These containers are all supported within housing 10 which has a back 26 and a front 28 as shown in FIG. 2. A door 34 closes the front of the housing. Advertising material can be supported by the door. Item 38 may represent a window so that the user of this unit can readily see which condiment or other fluid is where. Of course, the window would not have to be there, and one could merely indicate which condiment was available where. A display panel could also be provided on the door in place of a window. A squeezer unit frame 14 is provided in the unit and its means of suspension therein will be described later. A nipple 16 is provided for each condiment container 12, and the nipple extends through the squeeze unit frame 14.

In the embodiment shown, the open top (now the bottom or lower end) of the inverted container is connected to the nipple 16 by a connector 25.

Figure 13:
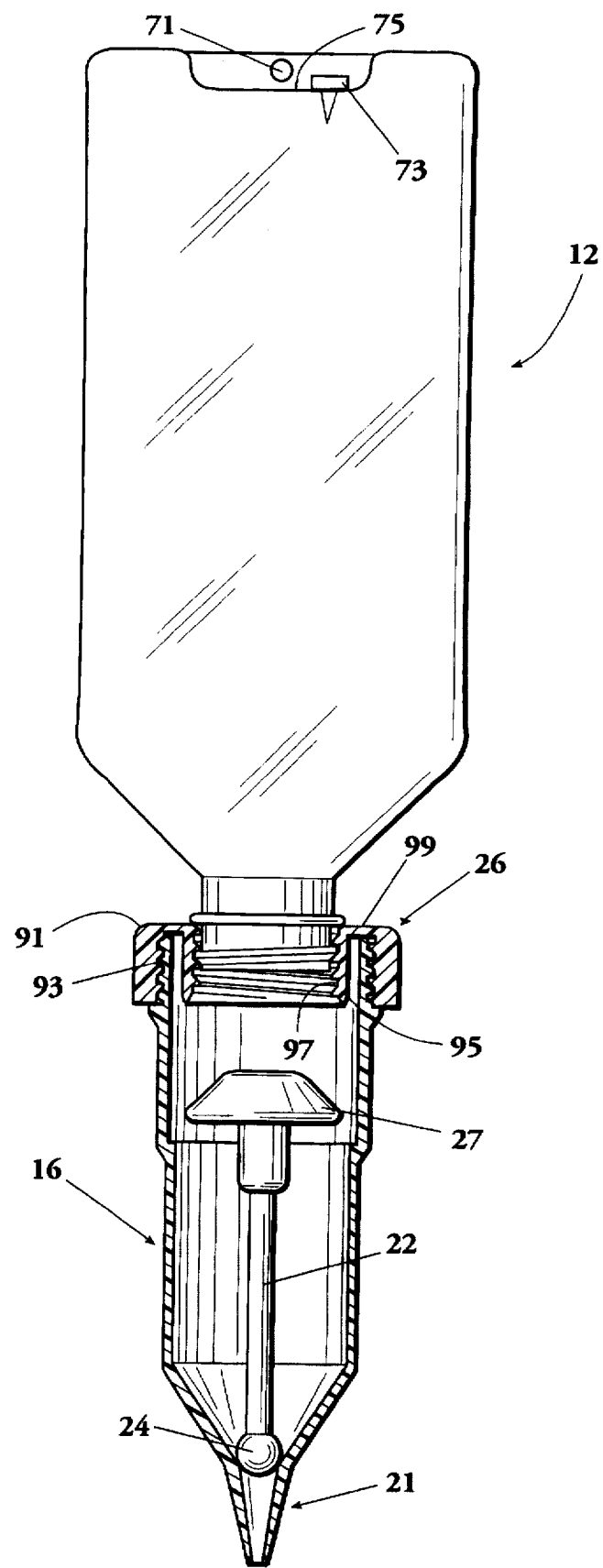
FIG. 13 illustrates in enlarged detail the valve indicated in the squeezable nipple of FIGS. 1, 2, and 5.

Attention is directed to FIG. 13. The connector ring 26 includes two concentric rings, outer ring 91 with threads 93 and inner ring 95 having internal threads 97. The neck of the bottle is threaded to threads 99, and the threads of nipple 13 connect to threads 93 of ring 91. The annular space between rings 91 and 95 is closed by annular washer-like section 99. Within the squeezable nipple 16 is a valve which includes a rod 22 with a valve 24 and upper umbrella structure 27. When the filled nipple 16 is squeezed, the umbrella structure 27 is forced upwardly, causing valve 24 to be unseated from the seat in the cone-shaped portion of the tip 21 of the nipple 16. This causes the fluid such as mustard, catsup, and so forth which has flowed downwardly from container 12 to be dispensed through the opening in the bottom of the tip 21. Fluid continues to flow from condiment container 12, into nipple 16, around umbrella structure 27 and exits past valve 24 as nipple 16 is squeezed. Thus one function of umbrella structure 27 is to lift valve 24 off its seat when the nipple is squeezed when the container is in the position shown in FIGS. 1 and 2. The umbrella structure 27 is typically shaped like a truncated cone in which the largest diameter is small enough to permit flow of the selected condiment between the structure 12 and the inner wall of the nipple 16 but big enough to have an area on its downside surface sufficiently large so that when the filled nipple is squeezed it is moved up enough to open valve 24.

The squeezing unit will be shown and described in greater detail hereinafter. However, as shown schematically in FIG. 2, the unit includes push rod 18, a pair of rollers 36 (although only one is shown in this figure) supported from push rod 18 by arm 40. The rod 18 extends through a support 44 and, when pushed, causes the two rollers to move in a direction toward the back 26 to the position of FIG. 6 and to squeeze the nipple 16, thus flowing fluid out the bottom through the opening in tip 21. A biasing means such as spring 42 is provided to return the push rod 18 to its original at rest position. As it returns, the rollers 36 return to their at rest position of FIG. 6, left hand unit.

There is also shown a fixed tray 30 which is positioned just below the connector 25 and a slide tray 32 supported above the fixed tray. The fixed tray 30 and slide tray 32 help maintain the condiment container 11 in upright inverted position.

The housing can be provided with a cooling unit 46. A suitable temperature control unit is a heat-cool pump available from Ulus Industrial Corporation and is described as their Model P34D Deluxe Caddy, Bradford, Ontario, Canada.

The unit is also preferably provided with a light 48 at the top and a spill tray 50 at the bottom beneath the dispensing nipples 16.

Figure 5:
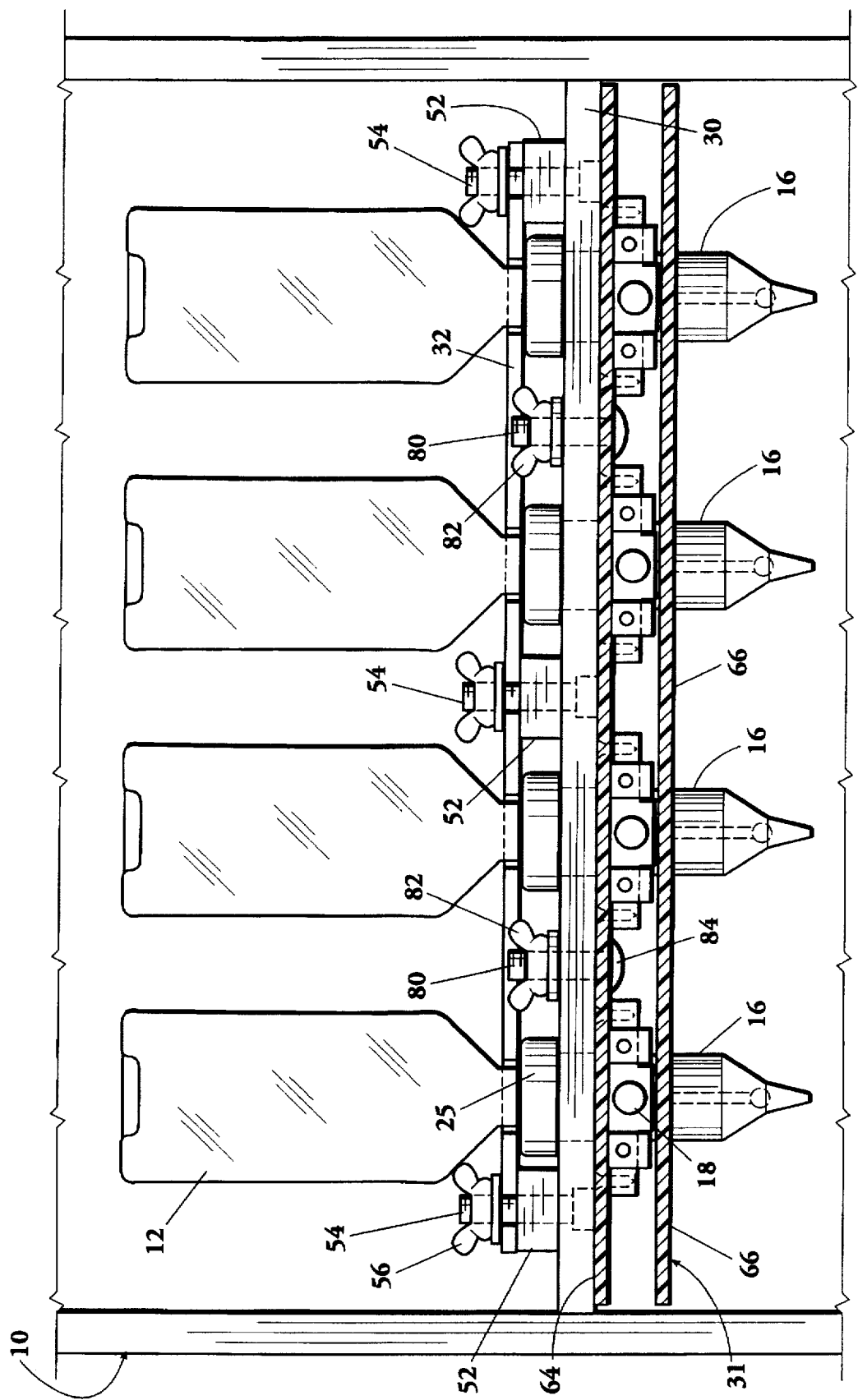
FIG. 5 is a view of FIG. 2 taken along the line 5—5.
Figure 9:
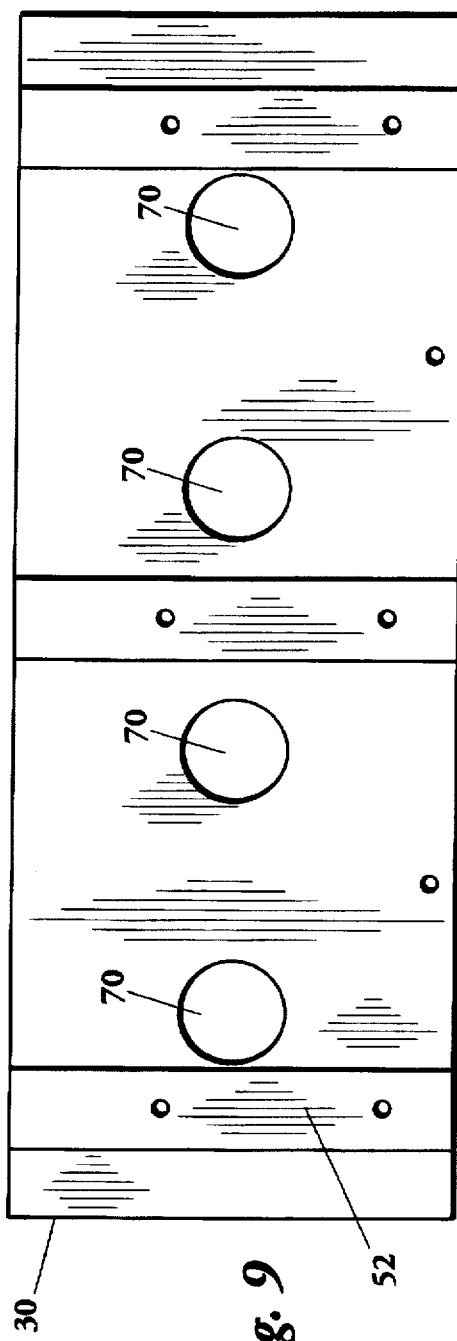
FIG. 9 is a top view of the fixed tray.
Figure 10:
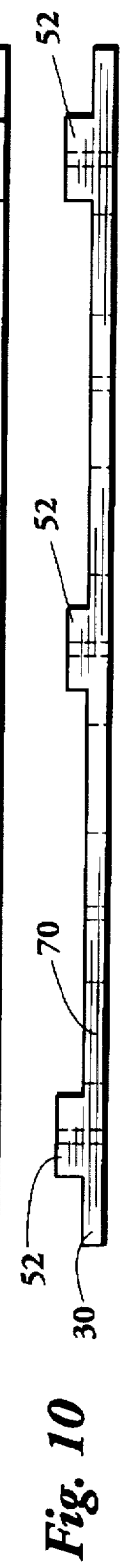
FIG. 10 is a front view of the fixed tray of FIG. 9.

Attention is next directed to FIG. 5 which illustrates in greater detail the structural relationship with slide tray 32, fixed tray 30, and the frame 31 for the mechanical squeeze unit. Fixed tray 30 is fixed to and supported from housing 10. The term "fixed" is used in that it is fixed during the operations and would normally be fixed; however, it could be screwed in or connected by bolts so it could be fastened by bolts to the housing, or it can be removed in that manner. Normally it would stay in the position shown. Supported above the fixed tray 30 are spacing blocks 52 (also see FIGS. 9 and 10). These spacing blocks are secured to or made a part of fixed tray 30. Mounted on top of the spacing blocks 52 is the slide tray 32. Extending upwardly from the spacing blocks 52 are a plurality of bolts 54 and nuts 56 which can secure the slide tray to the fixed tray.

Attention is next directed to FIGS. 9, 10, 11, and 12 which show the fixed plate configuration alone and the slide tray alone. Attention is first directed to FIGS. 9 and 10 which show the fixed tray 30. This tray is preferably the same size as the cross-section of the interior of the housing 26, and it is secured thereto. It has a plurality of spacing blocks 52 which are mounted on top of the fixed tray 30. There is also a circular hole 70 for each dispensing nipple. The holes permit the flexible nipple 16 to pass through but stop the nipple connector 25. As shown in FIG. 5, there is a threaded bolt 54 extending above spacing blocks 52. There are shown two such bolts for each spacing block.

Figure 11:
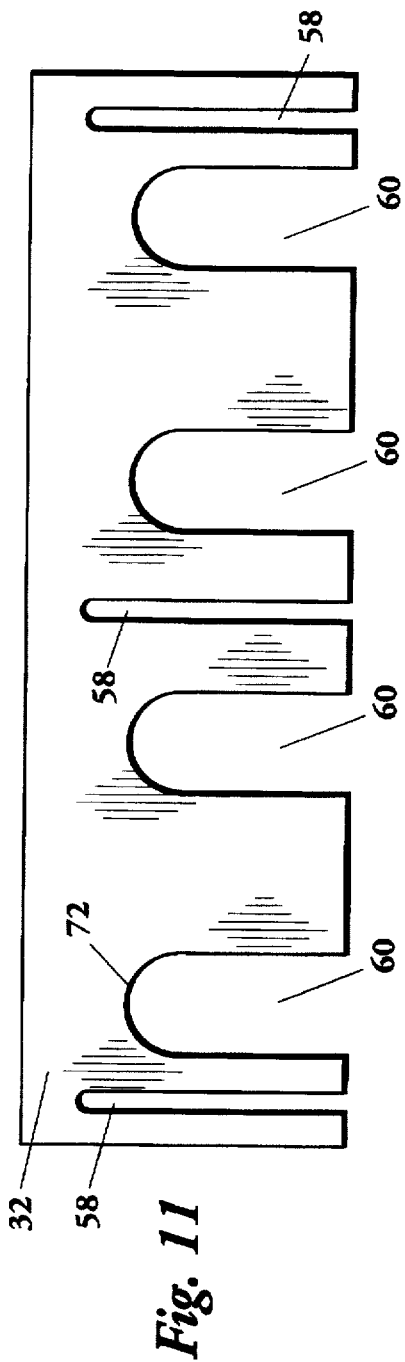
FIG. 11 is a plan view of the movable or slidable tray.
Figure 12:
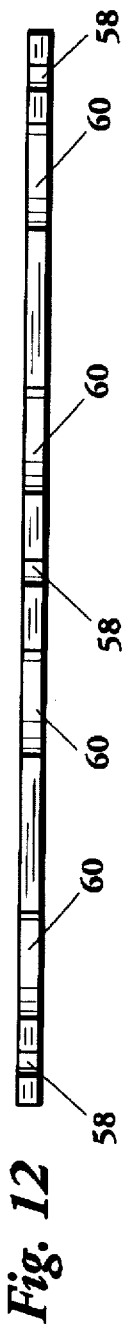
FIG. 12 is a front view of the slidable tray of FIG. 11.

Attention is next directed to FIGS. 11 and 12 which illustrate the slide-in tray 32. It has a plurality of notches 60 which open toward the front of the plate. The back end of the plate notches expands into a half-circle 72. The diameter of this half-circle is preferably approximately the same size as the diameter of the hole 70 in the fixed plate. The slide tray 32 also contains a plurality of slots 58 which extend from near the backside of the tray to open in the front. The slots 58 are to accommodate threaded bolts 54 which extend upwardly from spacing blocks 52. According to FIG. 3, the slide tray 32 can be removed, but normally is not. It can be slid between the position shown in FIG. 3 which is its front position to its back position where the back side of the tray 32 is against the back wall of housing 26.

Figure 7:
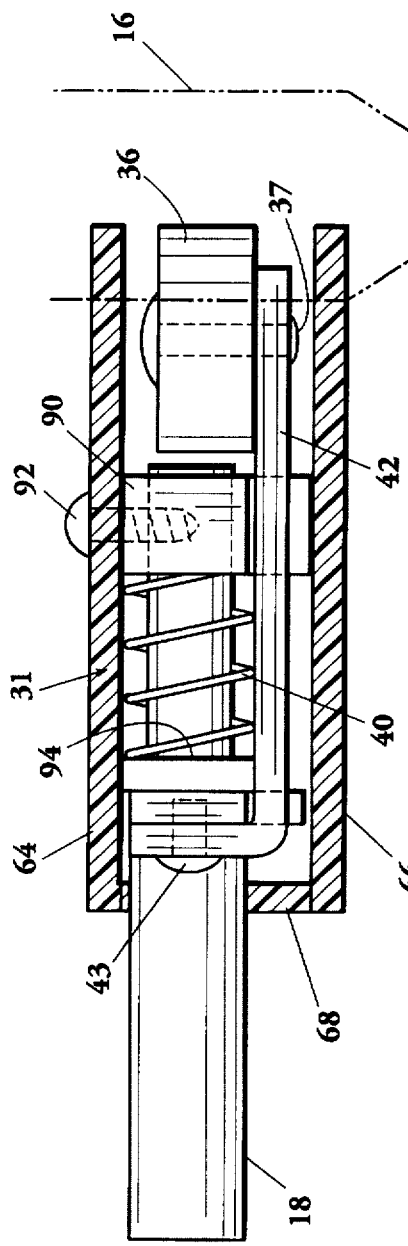
Figure 8:
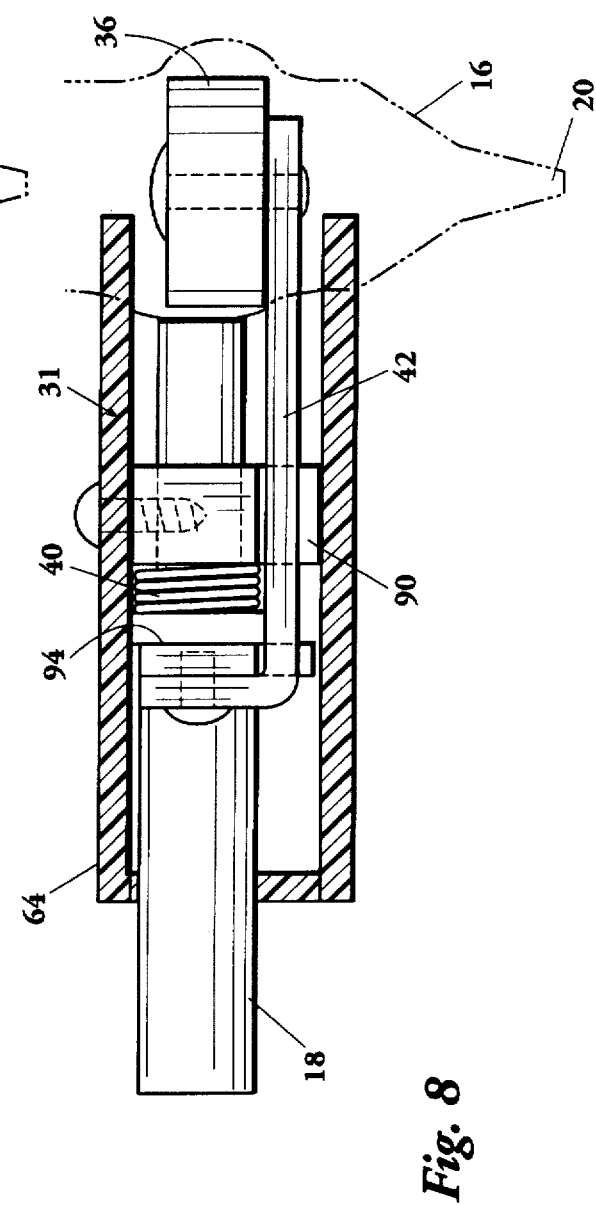

Attention is now directed back to FIG. 5 especially to illustrate the suspension of the pushbutton housing supported beneath the fixed tray 30. The housing includes a top plate or upper plate 64 and a lower plate 66 and as shown in FIGS. 7 and 8, a front plate 68 connects the two and holds them firm with respect to each other. A bolt 80 extends up through upper plate 64 and fixed tray 30. A nut 82 is secured to the bolt 80 and secures the pushbutton housing in a snug position against the fixed plate. The hole in upper plate 64 is preferably a key hole or guitar shape so that it has a round hole which is big enough to permit the head 84 to extend therethrough. Then when the plate is slid further in, the bolt proper will slide through the narrow slot, and the head of the bolt will then hold the housing to the fixed plate when the nuts 82 are tightened.

Attention is next directed to FIG. 7 which shows in enlarged detail the structure of the roller push squeezer. Shown thereon is a push rod 18 extending through a hole in the front plate 68 and through a second hole in rod support bracket 90. A lever, not shown, could be pivotally attached at one end to the frame such as frame 30 and extend over the end of push rod 18 so that it would be easier for a person of lesser strength to force rod 18 in to cause the squeezing effect of the rollers 36 on the nipple. The rod support bracket 90 is fixed to upper plate 64 of the support unit by a screw or bolt 92. The support unit frame 31 is secured to the fixed plate or tray 30 as indicated above by bolts 80 and nuts 82. Thus in the structure of FIG. 7, the bracket support unit 31 and rod support bracket 90 do not move during squeezing operations. The other portions do. The other portions include push rod 18 which passes through the hole in the first plate 68 and through a hole in rod support bracket 90. A spring 40 is positioned between shoulder 94 on the end of the enlarged portion of rod 18 and the rod support bracket 90. An arm 42 is fixed to rod 18 by screws 43 and extends through a hole in support bracket 90. Arm 42 supports roller 36 through axle 37 which is supported near the end of arm 42.

Figure 6:
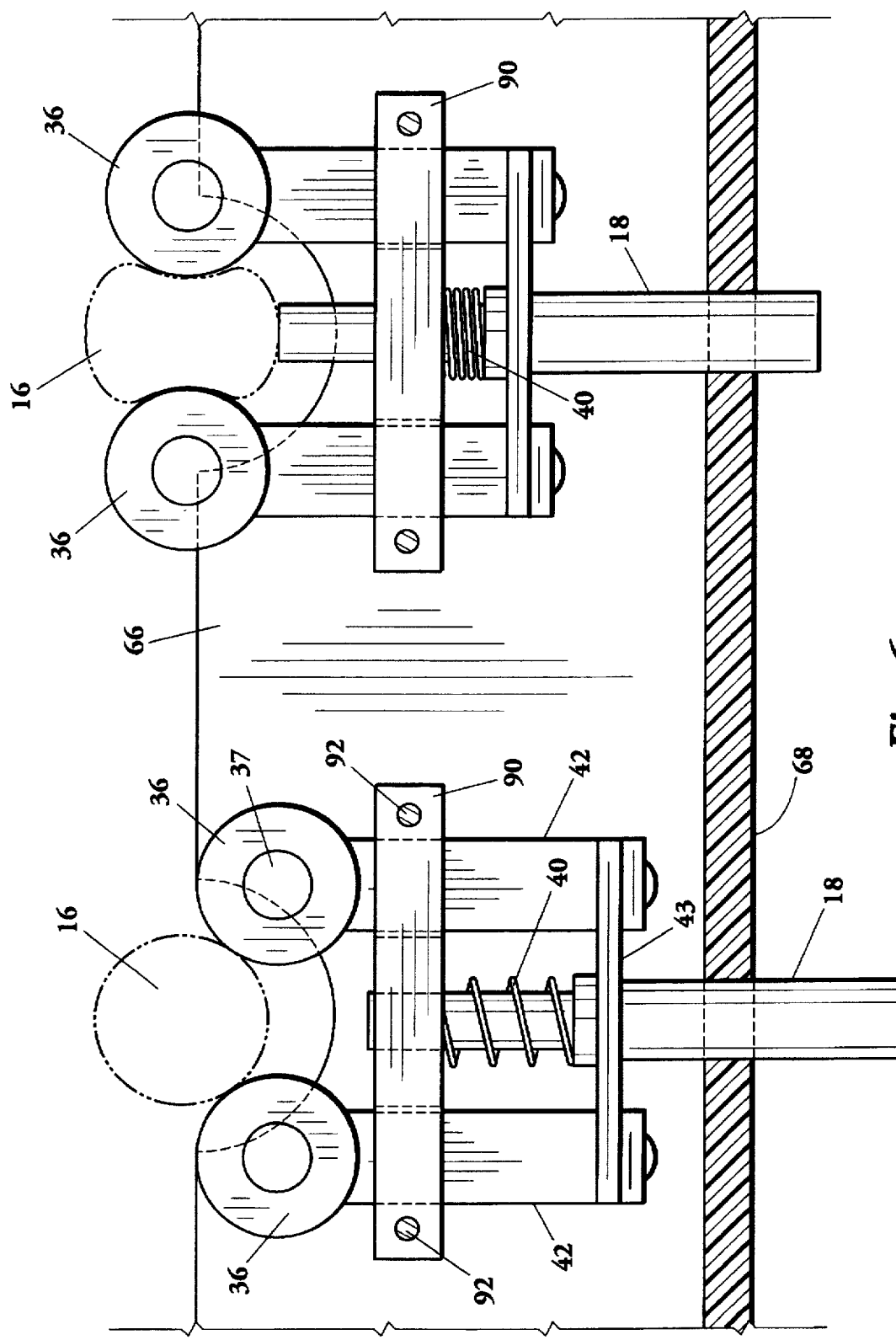
FIG. 6 is a detailed drawing of the squeezing action of the squeezing units of FIG. 3.

Attention is now directed to FIGS. 6, 7, and 8 for an illustration of the details of the squeezing action. In FIG. 7 the biasing means is shown as spring 40 which is in a relaxed position and the roller is barely contacting the nipple 16 which is also shown from the top view in FIG. 6 on the left-hand side. When in this position, nothing happens. This is the "at rest" position. When it is desired to obtain the condiment from nipple 16, push rod 18 is pushed in as illustrated in FIG. 8 and in the right-hand side of FIG. 6. There the rollers 36 are shown as squeezing nipple 16 into a deformed position. The squeezing action on the nipple 16 and its contents causes umbrella structure 27 to be forced up near but not in contact with inner ring 95 so that the flow of the fluid from container 12 into nipple 16 is not restricted. When umbrella structure 27 is forced up, it pulls ball valve 24 off of the seat in the tip 21 of the nipple 16. The squeezing pressure and gravity on the fluid causes the dispensing of the condiment through the open end of nipple 21. Just before the rod 18 is pushed, the customer holds his hot dog or other food on which he desires the condiment to be placed, beneath the nipple 21. The customer then pushes the push rod 18 to the position shown in the right-hand unit of FIG. 6 and that of FIG. 8 to cause the dispensing of the selected condiment.

The condiment container preferably has a hole 71 as shown in FIG. 13 on a cross member or strengthening rib of the container 12. It also has a plug 73 which can be removed to open an air-hole in the bottom portion 75. The plug 73 is normally in the bottom for transportation of the condiment and storage of it. However, when it is to be used as shown in FIG. 13, the plug 73 is removed to permit air to enter the bottle 12 as the condiment is used up. Normally the condiment containers 12 will be stored in position just inverted from what is shown in FIG. 13 and has a cap on the upper end. When it is desired to use a container with condiment, the connector 25 shown in FIG. 13, together with the nipples valve shown thereon, is screwed onto the threads of the neck of the container 12. Then the bottle is turned upside down, and valve 24 again prevents the flow of condiment out of nipple 21 until it is squeezed as described above in connection with FIGS. 6, 7, and 8.

Figure 15:
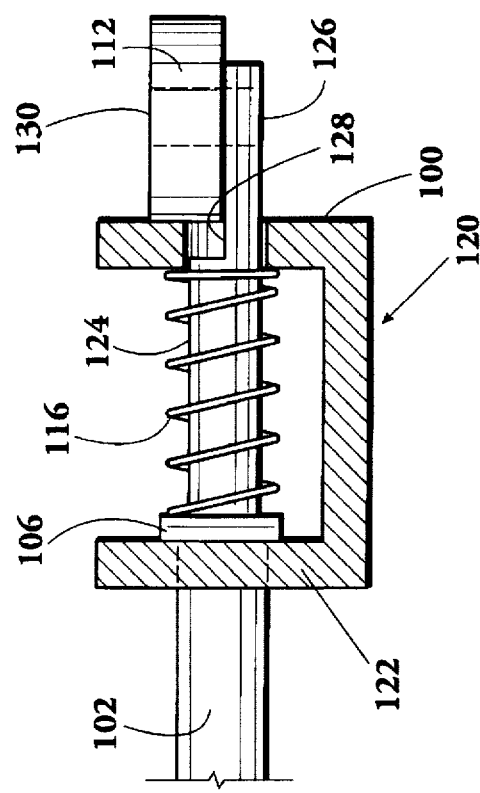
FIG. 15 is a view taken along the line 15—15 of FIG. 14.
Figure 14:
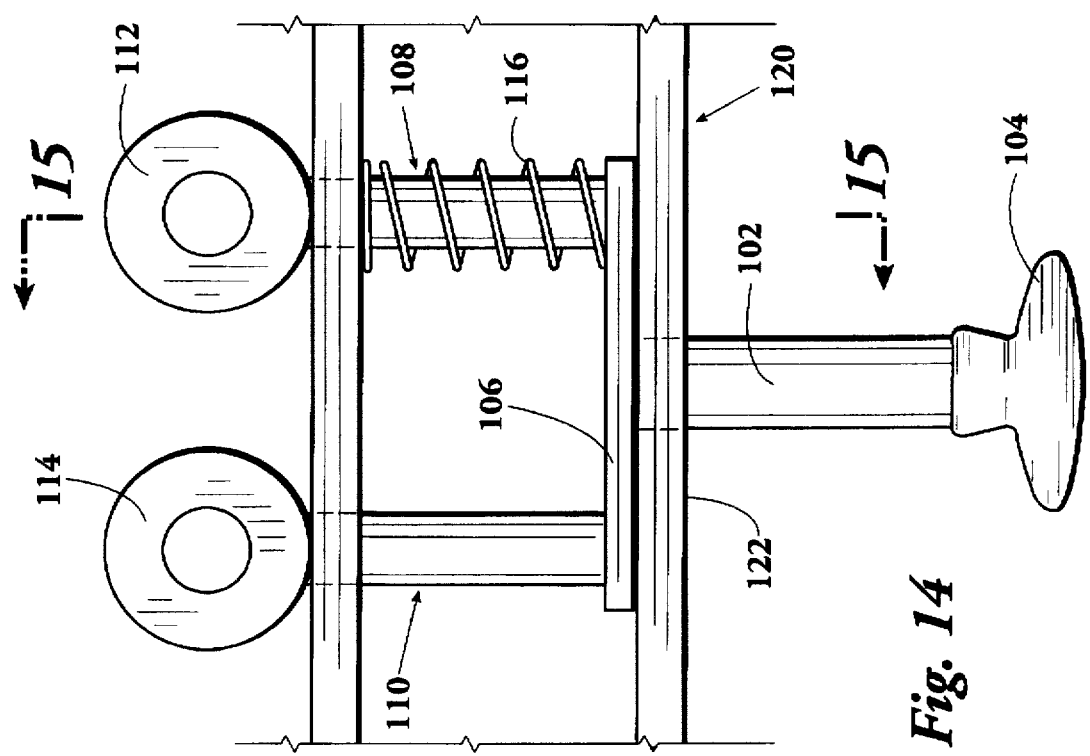
FIG. 14 illustrates a modification of the roller push assembly of FIG. 4.

Attention is next directed to FIGS. 14 and 15 which show the preferred construction of the push rod, its support, and its connection to the rollers. Shown thereon is a push rod 102 having a pushbutton 104. The rod 102 extends through a hole in the wall of upright member or front plate 122 of frame 120. Frame 120 is attached to the fixed plate 30 in the same way as the attaching of frame 31. Rod 102 connects to lateral bar 106 on the inside of front plate 122. Attached to lateral bar 106 is a first arm 108 and a second arm 110 parallel thereto. Both arms extend through holes in upright member or back plate 100 of frame 120. A spring 116 biases the arms 108 and 110 and lateral member 106 back toward frame 120 to the position shown in FIG. 14. Arms 108 and 110 each have an inner portion 124 and an outer portion 126. The inner portion 124 is typically round or circular, and the outer end or section 126 is semicircular and is flattened off to have a flat surface 128. It is from this flat surface 128 that roller 112 is supported by pin 130 in any convenient manner. This operates essentially the same as that described above. When it is desired to dispense a condiment or liquid or any kind, button 104 is pushed in, which causes the spring 116 to be compressed and causes roller 112 and roller 114 to move over the nipple, thus squeezing it to obtain the squeezing effect described above. When the force on the button 104 is released, spring 116 causes the roller arms 108 and 110 and pushbutton 102 to return to the position shown in FIG. 14. It has also been found that by making the frame 120 out of wood that the rods slide easily through the holes therein.

While the invention has been described with a certain degree of particularity, it is manifest that many changes may be made in the details of construction without departing from the spirit and scope of this disclosure. It is understood that the invention is not limited to the embodiment set forth herein for purposes of exemplification, but is to be limited only by the scope of the attached claim or claims, including the full range of equivalency to which each element thereof is entitled.

What is claimed is:

1. A condiment dispensing unit which comprises:

a housing having a front and a back;

a fixed tray supported within said housing and having holes therein a slide tray supported from and above said fixed tray and moveable from a back position to a forward position, said slide tray having at least one notch extending from its front edge to an intermediate point in which the inner end of the notch, when the slide tray is in a forward position, is vertically aligned with its corresponding hole in said fixed tray;

means to hold said slidable tray in a rear position and in a forward position;

squeezing means within said housing supported adjacent said fixed tray for squeezing a flexible nipple.

2. A dispensing unit as defined in claim 1 in which said squeezing means includes a plurality of units, each unit having a support bracket having a front plate and supported by said fixed plate, said front plate having a hole therethrough;

a push rod extending from outside said housing through the hole in said front plate;

two spaced apart parallel arms supported from said push rod within said bracket;

a vertical roller at the end of each said arm;

biasing means for biasing the push rod in a direction outwardly from said support bracket.

3. A dispensing unit as defined in claim 2 including a cooling unit in said housing.

4. A condiment dispensing unit as defined in claim 2 including a display panel in said door and a light within said housing for illuminating said display panel.

5. A dispensing unit as defined in claim 2 including a plurality of spacing blocks supported on top of said fixed plate with bolts extending through the top thereof for spacing the slide tray a desirable height above said fixed tray.

6. A dispensing unit as defined in claim 5 in which the slide-in tray has a plurality of slots opening toward the front side thereof, said bolt extending upwardly from said spacing blocks through said slot, and nuts on top of said bolts to secure said slide-in plate in a selected position.

7. A dispensing unit as defined in claim 6 in which the width of the notch in said slide-in plate is approximately the same as the diameter of the hole in said fixed plate.

8. A fluid dispensing unit comprising:

a housing having a front and a back;

holding means including a fixed plate in said housing;

squeezing means for squeezing a flexible nipple supported within said housing adjacent said holding means;

said squeezing unit having a support bracket having a front plate and a back plate and supported by said fixed plate, said front plate having a hole therethrough, said back plate having two holes;

a push rod extending from outside said housing through the hole in said front plate;

a lateral bar support at one end of said rod and inside said front plate;

two spaced apart parallel arms supported from said push rod within said brackets and extending through said holes in said back plate;

each said arm having a first round portion and a second section having a half round portion having a flat surface;

a vertical roller at the end of each said arm supported at the flat surface;

biasing means for biasing the push rod in the direction outwardly from said support bracket.

9. A liquid dispensing unit for use with a condiment bottle having a flexible nipple connected thereto which comprises;

a housing having a front and a back;

holding means including a fixed plate in said housing for holding said bottle in an upright position;

squeezing means supported within said housing adjacent said holding means operable for squeezing said nipple to dispense a liquid;

said squeezing means including a support bracket having a front plate and a back plate and supported by said fixed plate, said front plate having a hole therethrough, and said back plate having two holes;

a push rod extending from outside said housing through the hole in said front plate;

a lateral bar support at one end of said rod and inside said front plate;

two spaced apart parallel arms supported from said push rod within said bracket and extending through said holes in said back plate;

each said arm having a first round portion and a second section having a half-round portion having a flat surface;

a vertical roller at the end of each said arm supported at the flat section, the distance between the said rollers being less than the diameter of said dispensing nipple and spaced such that when said push rod is pushed, the vertical roller is operable to squeeze the plastic nipple to dispense material therefrom;

biasing means for biasing the push rod in a direction outwardly from said support bracket.

10. A dispensing unit as defined in claim 9 in which the bracket is made of wood.

* * * * *